United States Patent
Bilal et al.

(10) Patent No.: US 11,259,253 B2
(45) Date of Patent: Feb. 22, 2022

(54) VICTIM AWARE POWER CONTROL METHOD AND APPARATUS IN WIRELESS COMMUNICATION SYSTEM

(71) Applicant: HANKUK UNIVERSITY OF FOREIGN STUDIES RESEARCH & BUSINESS FOUNDATION, Yongin-si (KR)

(72) Inventors: Muhammad Bilal, Yongin-si (KR); Zeeshan Kaleem, Islamabad (PK)

(73) Assignee: Hankuk University of Foreign Studies Research & Business Foundation, Yongin-si (KR)

( * ) Notice: Subject to any disclaimer, the term of this patent is extended or adjusted under 35 U.S.C. 154(b) by 0 days.

(21) Appl. No.: 16/852,748

(22) Filed: Apr. 20, 2020

(65) Prior Publication Data

US 2020/0383065 A1     Dec. 3, 2020

(30) Foreign Application Priority Data

May 28, 2019  (KR) ........................ 10-2019-0062539

(51) Int. Cl.
*H04W 52/24*       (2009.01)
*H04L 5/00*        (2006.01)
(Continued)

(52) U.S. Cl.
CPC ......... *H04W 52/244* (2013.01); *H04L 5/0048* (2013.01); *H04L 5/0073* (2013.01);
(Continued)

(58) Field of Classification Search
CPC ............ H04W 52/244; H04W 52/241; H04W 52/245; H04W 60/00; H04W 84/045;
(Continued)

(56) References Cited

U.S. PATENT DOCUMENTS

2011/0110254 A1*  5/2011  Ji .................... H04W 36/0066
                                                   370/252
2011/0237243 A1*  9/2011  Guvenc ............ H04W 72/1231
                                                   455/423

(Continued)

FOREIGN PATENT DOCUMENTS

KR    10-2012-0088815 A    8/2012
KR    10-2013-0010128 A    1/2013

(Continued)

OTHER PUBLICATIONS

3GPP TR 36.921 V15.0.1, "Evolved Universal Terrestrial Radio Access (E-UTRA); FDD Home eNode B (HeNB) Radio Frequency (RF) requirements analysis," Release 15 (Oct. 2018).

(Continued)

*Primary Examiner* — Fahmida S Chowdhury
(74) *Attorney, Agent, or Firm* — Rabin & Berdo, P.C.

(57) ABSTRACT

The present invention discloses a power control apparatus and method in a wireless communication system. According to the present invention, among FUE units neighboring to an MUE unit of a victim cell, an FUE unit of an aggressor cell (Continued)

may be derived on the basis of information on RSRP of the FUE unit registered in a closed subscriber group, and a threshold interference value of the FUE unit. Also, power of the derived FUE unit of the aggressor cell may be gradually decreased until an interference of the MUE unit of the victim cell becomes greater than a predefined threshold interference value, and an SINR of the FUE unit of the aggressor cell becomes equal to or greater than a target SINR. Accordingly, CCI can be reduced in a heterogeneous network environment, data transmission speed can be improved, and latency time can be reduced by reducing feedback time.

7 Claims, 3 Drawing Sheets

(51) Int. Cl.
  *H04W 24/08* (2009.01)
  *H04W 60/00* (2009.01)
(52) U.S. Cl.
  CPC ......... *H04W 24/08* (2013.01); *H04W 52/241* (2013.01); *H04W 52/245* (2013.01); *H04W 60/00* (2013.01)
(58) Field of Classification Search
  CPC .... H04W 24/10; H04W 52/243; H04L 5/0073
  See application file for complete search history.

(56) References Cited

U.S. PATENT DOCUMENTS

| 2012/0250558 | A1* | 10/2012 | Chung | H04B 7/0632 370/252 |
| 2014/0335849 | A1* | 11/2014 | Lalam | H04W 52/265 455/422.1 |
| 2015/0111592 | A1* | 4/2015 | Chang | H04W 16/10 455/452.1 |
| 2015/0173089 | A1* | 6/2015 | Baghel | H04W 48/12 370/329 |

FOREIGN PATENT DOCUMENTS

| KR | 10-2014-0006270 A | 1/2014 |
| WO | 2011/056846 A1 | 5/2011 |
| WO | 2011/133708 A1 | 10/2011 |

OTHER PUBLICATIONS

3GPP TR 36.922 V15.0.0, "Evolved Universal Terrestrial Radio Access (E-UTRA); TDD Home eNode B (HeNB) Radio Frequency (RF) requirements analysis", Release 15 (Jun. 2018).
3GPP TS 22.220 V9.10.0, "Service requirements for Home Node B (HNB) and Home eNode B (HeNB)", Release 9 (Sep. 2012).
3GPP TS 36.300 V15.8.0, "Evolved Universal Terrestrial Radio Access (E-UTRA) and Evolved Universal Terrestrial Radio Access Network (E-UTRAN), Stage 2," Release 15 (Dec. 2019).

* cited by examiner

VICTIM AWARE POWER CONTROL METHOD AND APPARATUS IN WIRELESS COMMUNICATION SYSTEM

CROSS REFERENCE TO RELATED APPLICATION

The present application claims priority to Korean Patent Application No. 10-2019-0062539, filed May 28, 2019, the entire contents of which is incorporated herein for all purposes by this reference.

BACKGROUND OF THE INVENTION

Field of the Invention

The present invention relates to a power control method and apparatus in a wireless communication system. More particularly, the present invention relates to controlling power of an aggressor cell so as to reduce co-channel interference (CCI) in uplink transmission due to sharing the same frequency band between a femto user equipment (FUE) unit and a macro user equipment (MUE) unit. The appealing feature of the invention is that it considers the victim situation while controlling the user's power.

Description of the Related Art

Long term evolution (LTE) femto cells can use all available frequency bands defined in the 3rd Generation Partnership Project (3GPP), and serious co-channel interference occurs between a macro cell user and a femto cell user, and between a femto cell user and a femto cell user. In addition, a dedicated band for a femto cell is not present.

However, in a heterogeneous network, there are three major upload link interferences: interference in an uplink signal from a FUE unit to an MUE unit; interference in an uplink signal from an MUE unit to an FUE unit; and interference in an uplink signal from an FUE unit to a neighboring FUE unit within the same macro cell.

In order to reduce such co-channel interferences, exchanging user information between base stations by using a general X2 interface has to be performed, and this causes increases in loads for providing a feedback process. Accordingly, a conventional method of reducing co-channel interference by using an X2 interface cannot be applicable to a heterogeneous network with high density.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent Application Publication No. 10-2013-0010128 "Semi-persistent scheduling grants in heterogeneous networks";

(non-Patent Document 1) 3GPP, "FDD home eNode B (HeNB) radio frequency (RF) requirements analysis," TR 36.921 version 15.0.1, Release 15;

(non-Patent Document 2) 3GPP TS 22.220: "Service requirements for home node B (HNB) and home eNode B (HeNB)", v9.1.1;

(non-Patent Document 3) 3GPP, "Evolved universal terrestrial radio access (E-UTRA) and evolved universal terrestrial radio access network (E-UTRAN), Stage 2," TS 36.300 version 15.0.2, Release 15; and (non-Patent Document 4) 3GPP TR 36.922: "Evolved universal terrestrial radio access (E-UTRA); TDD home eNode B (HeNB) radio frequency (RF) requirements analysis".

SUMMARY OF THE INVENTION

An objective of the present invention is to provide a power control apparatus and method in a wireless communication system, the apparatus and method being capable of controlling power of an FUE unit of an aggressor cell so as to decrease co-channel interference between a non-registered MUE unit and a FUE unit registered in a femto base station (FeNB) within a heterogeneous network environment.

Technical solutions obtainable from the present disclosure are not limited the above-mentioned technical solutions, and other unmentioned technical solutions can be clearly understood from the following description by those having ordinary skill in the technical field to which the present invention belongs to.

In order to achieve the above objective, according to one aspect of the present invention, there is provided a method of controlling a wireless communication system, wherein the system is configured with multiple femto base stations (FeNBs) in which one femto user equipment (FUE) unit is registered in each FeNB, and an evolved base station (eNB) including multiple macro user equipment (MUE) units; and, the method including: registering information on reference signal receive power (RSRP) of the registered FUE in the FeNB and the eNB; performing communication with the registered FUE unit and the MUE unit; and controlling power of the FUE unit in association with an aggressor cell by using RSRP information received from the eNB when co-channel interference occurs in uplink communication with the registered FUE unit and with an MUE unit that is not registered in the FeNB.

Preferably, the RSRP may be a linear average over power contributions of resource elements that carry cell-specific reference signals within a measurement frequency bandwidth.

Preferably, the controlling power of the FUE unit may include: calculating, by the MUE unit where the co-channel interference has occurred, a threshold interference value of a neighboring FUE unit by using a target signal-to-interference-plus-noise ratio (SINR); determining, by the FeNB, whether or not the registered FUE unit is in association with the aggressor cell on the basis of the received threshold interference value and the RSRP information registered in the FeNB; registering, by the FeNB, the FUE unit of the aggressor cell in an aggressor cell list when it is determined that the registered FUE unit is in association with the aggressor cell, and transferring the aggressor cell list to the eNB; performing, by the eNB, sorting for aggressor cell lists of multiple FeNBs so as to determine a worst FUE unit of the aggressor cell, and transferring information on downlink RSRP of the worst FUE unit of the aggressor cell to the FeNB in which the worst FUE unit of the aggressor cell is registered; and gradually decreasing, by the FeNB in which the worst FUE unit of the aggressor cell is registered, power of the worst FUE unit of the aggressor cell.

Preferably, the power of the worst FUE unit of the aggressor cell may be repeatedly decreased until an interference value $I_{victim}^{rec}$ the MUE unit that is in association with a victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR^{aggressor}$.

Preferably, the controlling, by the FeNB, power of the FUE unit may be repeated until a relation between powers of the MUE unit of the victim cell and the FUE unit of the aggressor cell satisfies Equation 1 below, $$P_{PUSCH,i}^{FIMUE} = P_{PUSCH,i-1}^{FIMUE} \quad [\text{Equation 1}]$$

In order to achieve the above object, according to another aspect of the present invention, there is provided a wireless communication system, wherein the system is configured with multiple femto base stations (FeNBs) in which one femto user equipment (FUE) unit is registered in each FeNB, and an evolved base station (eNB) including multiple macro user equipment (MUE) units, wherein the FeNB in which one FUE unit is registered is configured to receive a threshold interference value from the MUE unit, and information on downlink RSRP of the eNB, determine whether or not the FUE unit is in association with an aggressor cell on the basis of the received threshold interference value and pre-registered RSRP information of the FUE unit, and when it is determined that the FUE unit is in association with the aggressor cell, add the FUE unit to an aggressor cell list and transfers the aggressor cell list to the eNB; the eNB is configured to perform sorting for the received aggressor cell list so as to determine a worst FUE unit of the aggressor cell, and transfer information on downlink RSRP of the worst FUE unit of the aggressor cell to the FeNB in which the worst FUE unit of the aggressor cell is registered; and the FeNB, in which the worst FUE unit of the aggressor cell is registered, is configured to repeatedly decrease power of the worst FUE unit of the aggressor cell until an interference value $I_{victim}^{rec}$ of the MUE unit that is in association with a victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$.

In order to achieve the above object, according to still another aspect of the present invention, there is provided a power control apparatus in a wireless communication system, wherein the system is configured with multiple femto base stations (FeNBs) in which one femto user equipment (FUE) unit is registered in each FeNB, and an evolved base station (eNB) including multiple macro user equipment (MUE) units, the apparatus including: a calculation unit, calculating a threshold interference value of an adjacent FUE unit in an MUE unit of a victim cell receiving co-channel interference from the FUE by using a target SINR; a determination unit determining whether or not the registered FUE unit corresponds to an FUE unit of an aggressor cell on the basis of the threshold interference value received from the FeNB, and information on downlink RSRP of the FUE unit received from the eNB; an aggressor cell list transmission unit storing the registered FUE unit in an aggressor cell list of the FeNB when it is determined that the registered FUE unit corresponds to the FUE unit of the aggressor cell, and transferring the aggressor cell list to the eNB; a downlink RSRP transmission unit performing sorting for aggressor cell lists of multiple FeNBs received in the eNB so as to determine a worst FUE unit of the aggressor cell, and transferring information on downlink RSRP of the worst FUE unit of the aggressor cell to the FeNB in which the worst FUE unit of the aggressor cell is registered; and a power control unit gradually decreasing power of the worst FUE unit of the aggressor cell, wherein the power of the worst FUE unit of the aggressor cell is repeatedly decreased until an interference value $I_{victim}^{rec}$ of the MUE unit that is in association with a victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$.

According to an embodiment, among FUE units neighboring to an MUE unit of a victim cell, an FUE unit of an aggressor cell can be derived on the basis of information on RSRP of the FUE unit that is pre-registered in the closed subscriber group (CSG), and a threshold interference value of the FUE unit. Subsequently, power of the derived FUE unit of the aggressor cell may be gradually decreased until an interference value of the MUE unit of the victim cell becomes greater than a predefined threshold interference value, and an SINR of the FUE unit of the aggressor cell becomes equal to or greater than a target SINR. Accordingly, co-channel interference can be reduced in a heterogeneous network environment, data transmission speed can be significantly improved, and latency time can be reduced by reducing conventional feedback time.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
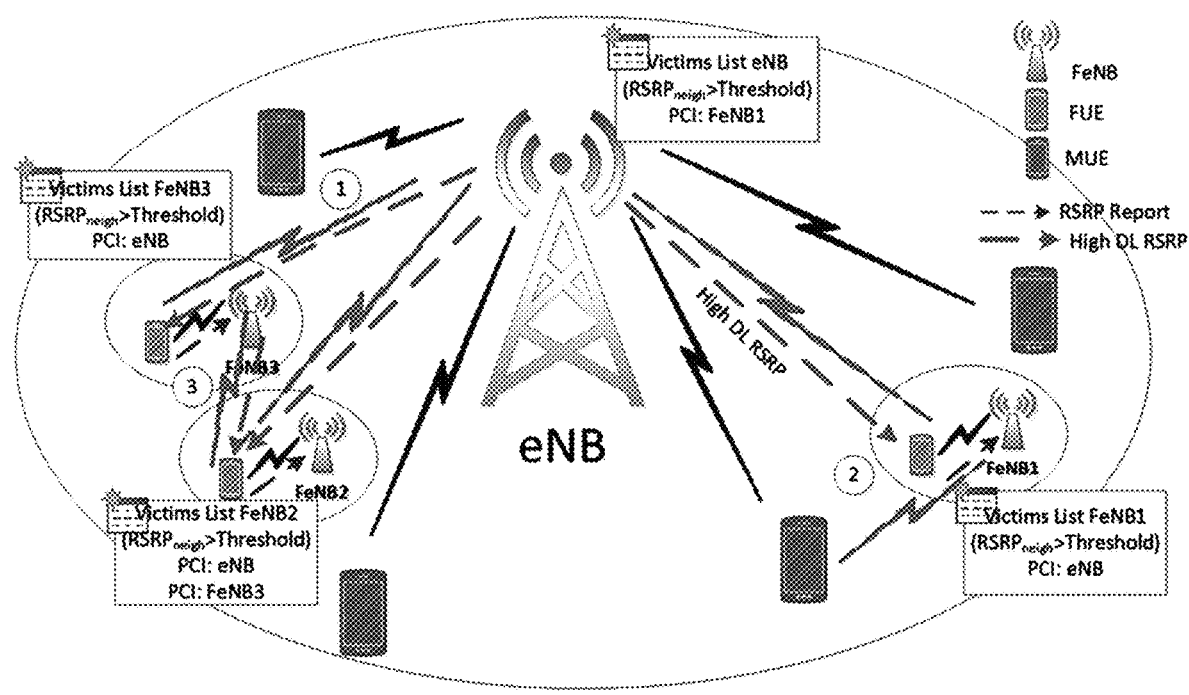
FIG. 1 is a view of a configuration of a wireless communication system applied to an embodiment.

Throughout the specification, the same or like reference numerals designate the same or like elements. Meanwhile, the embodiments should be considered in descriptive sense only and not for purposes of limitation. As used herein, the singular forms are intended to include the plural forms as well, unless the context clearly indicates otherwise. It will be further understood that the terms "comprises" and/or "comprising", when used in this specification, specify the presence of stated features, steps, operations and/or components do not preclude the presence or addition of one or more features, steps, operations and/or components.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), CDMA2000, etc. UTRA includes wideband CDMA (WCDMA) and other variants of CDMA. CDMA2000 covers IS-2000, IS-95 and IS-856 standards. A TDMA network may implement a radio technology such as global system for mobile communications (GSM).

An OFDMA network may implement a radio technology such as evolved UTRA (E-UTRA.), ultra mobile broadband (UMB), IEEE 80211(Wi-Fi), IEEE 80216 (WiMAX), IEEE 80220, Flash-OFDM, etc. UTRA and E-UTRA are part of a universal mobile telecommunication system (UMTS).

3GPP long term evolution (LTE) and LIE-advanced (LTE-A) are new releases of UMTS that use E-UTFRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for wireless networks and radio technologies mentioned above as well as other wireless networks and radio technologies.

A 5G mobile communication system applied to an embodiment can support mobile cells of various types as well as a cell by a fixed type base station.

Also, a femto base station (FeNB) according to an embodiment registers information on reference signal received power (RSRP) of one FUE unit that is registered in the FeNB, in an evolved base station (eNB), and determines whether or not the FUE unit corresponds to an aggressor on the basis of information on RSRP the FUE unit pre-registered in a closed subscriber group (CSG) of the eNB and a threshold interference value of the FUE unit. If so, the registered FUE is added to an aggressor cell list, and the aggressor cell list is transferred to the eNB. In addition, the eNB according to an embodiment determines the worst FUE unit of the aggressor cell by performing sorting for the received aggressor cell lists of FeNBs, and transfers information on RSRP of the FUE unit registered as the worst FUE unit of the aggressor cell to the FeNB. Subsequently, the FeNB controls power of the registered FUE unit.

FIG. 1 is a view of a wireless communication system to which an embodiment of applied. Referring to FIG. 1, the wireless communication system may include: multiple FeNBs in which one FUE unit is registered in each FeNB, and an eNB including multiple MUE units.

In the wireless communication system, a single cell may include a user equipment (UE) unit being provided with services from a macro base station (MeNB). Also, in the boundary region of the macro cells, pico cells are formed as a kind of macro cells so as to provide communication services by using pico base stations (pico eNB: PeNB), and femto base stations (femto eNB: FeNB) forming femto cells.

Herein, the macro cell may cover a relatively large geographic area (for example, several kilometers in radius) and may allow unrestricted access by UE units with service subscription. The pico cell may cover a relatively small geographic area and may allow unrestricted access by UE units with service subscription.

In addition, the femto cell may cover a relatively small geographic area (for example, a home,) and may allow unrestricted access by UE units in a closed subscriber group (CSG) having association with the femto cell.

Meanwhile, in order to distinguish a terminal receiving services from the FeNB from an MUE unit receiving services from the macro base station, and from a pico user equipment (PUE) unit receiving services from the pico base station, the terminal may be represented as a femto user equipment (FUE) unit. It is estimated that utilization of a heterogeneous network by installation of the above-mentioned small cells will increase.

When performing uplink transmission from the femto base station neighboring to an MUE unit that is not registered in a closed subscriber group (CSG) within the heterogeneous network formed with fixed or/and mobile small cells, co-channel interference occurs. In an example, in order to reduce the occurring CCI, power of an FUE unit of an aggressor cell may be controlled according to a situation of an MUE unit of a victim cell that is derived on the basis of a victim list of the closed subscriber group.

Figure 2:
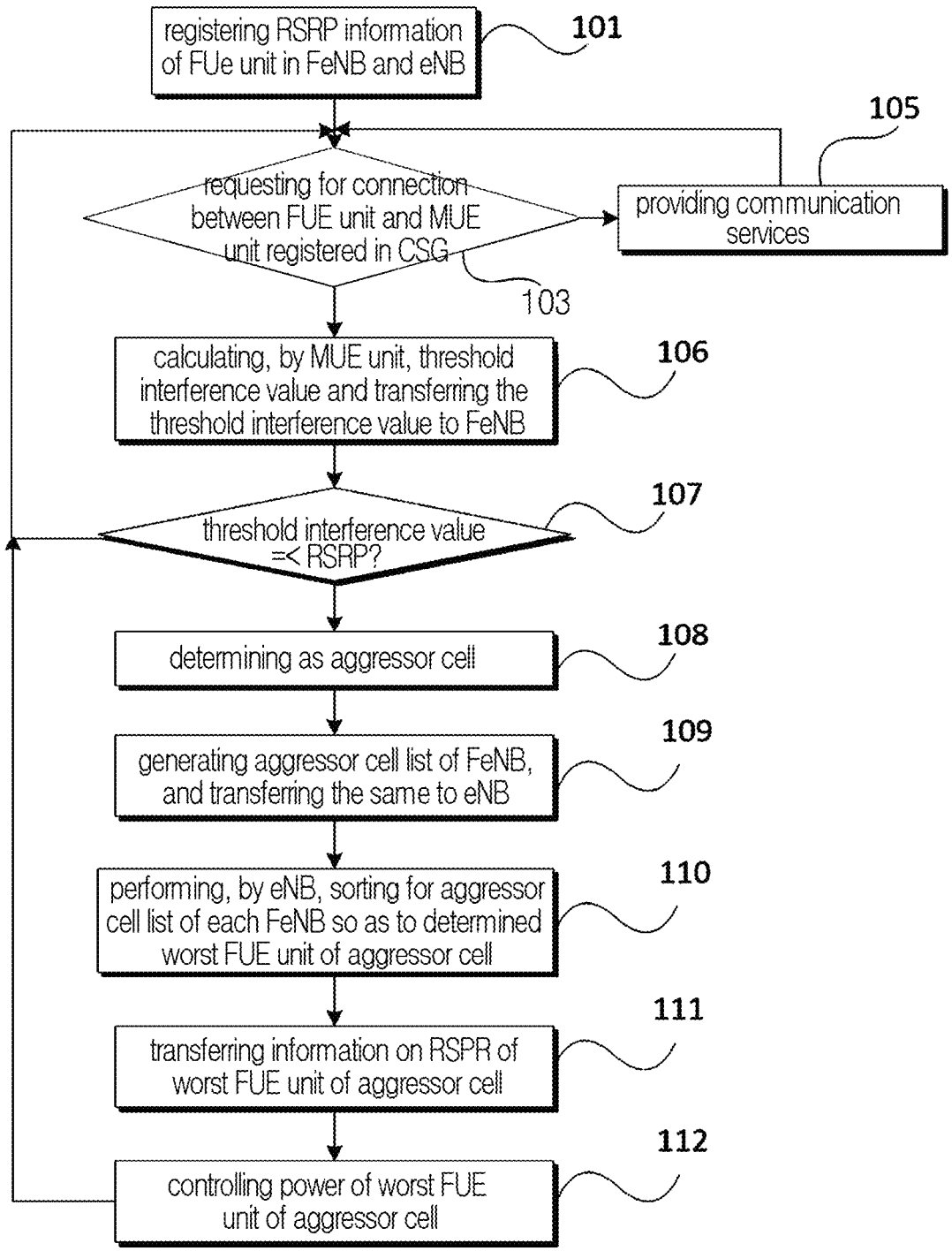
FIG. 2 is a view of a flowchart showing a power control process in an exemplary system.

FIG. 2 is a view of a flowchart showing a power control process for reducing co-channel interference in the wireless communication system shown in FIG. 1.

Referring to FIG. 2, first, in 101, the FeNB measures reference signal receive power (RSRP) of an FUE unit registered in a closed subscriber group so as to generate RSRP information, and stores the RSRP information. Herein, the RSRP information is defined as a linear average over power contributions of resource elements that carry cell-specific reference signals within a measurement frequency bandwidth. RSRP information included in a downlink receiving signal from the MeNB and/or the FeNB is used to generate an aggressor list in the eNB or/and the FeNB. When RSRP becomes large, uplink interference in an MUE unit also becomes large.

In 103, the FUE unit transmits a connection request so as receive communication services from the corresponding FeNB. Subsequently, in 105, the FeNB provides communication services between the FUE unit and an MUE unit when the MUE unit is present in a CSG list. In other words, the FUE transmits to the FeNB data in an uplink direction, and the FeNB transmits to the MUE unit data in a downlink direction.

However, in 103, when the MUE unit is not present in the CSG list, the MUE unit may receive co-channel interference from neighboring FUE units.

Herein, a co-channel interference value of the MUE unit of a victim cell may satisfy Equation 1 below.

$$I_{total}^{Victim} = \sum_{n=1}^{N} I_n \quad \text{[Equation 1]}$$

where n: total neighboring/aggressor cells

Herein, n is a number of neighboring aggressor cells.

In addition, a relation of CCI powers $P_{PUSCH,i}^{FIMUE}$ between the MUE unit of the victim cell and a neighboring UE unit satisfies Equation 2 below.

$$P_{PUSCH,i}^{FIMUE} = P_0 + \alpha(PL_{aggressor} - PL_{victim}) \quad \text{[Equation 2]}$$

where $P_0 = \alpha \cdot (SINR_{aggressor}^{tar} + IOT^{tol}) + (1\alpha) \cdot (P_{max} - 10 \log M)$ $$PL = RSRP - P_{Tx}$$

Herein, $P_0$ is initial power, $PL_{aggressor}$ is power of the neighboring FUE unit of the aggressor cell, $PL_{victim}$ is power of the MUE unit of the victim cell, and α is weighting factor. Also, the initial power $P_0$ may be derived by using a signal-to-interference-plus-noise ratio $SINR_{aggressor}^{tar}$ between the FUE unit of the aggressor cell and the MUE unit of the victim cell, a tolerable interference value $IOT^{tol}$ determined on the basis of simulation, maximum power $P_{max}$, and M. In addition, PL is derived by a difference between RSRP of the FUE unit of the aggressor cell, and transmission power $P_{Tx}$.

Assuming that at least one UE unit neighboring to the MUE unit of the victim cell uses the same resource, and one neighboring UE unit is present while deriving the overall interference value of the MUE unit of the victim cell, the overall interference probability during one time-frequency slot is small.

In an embodiment for reducing co-channel interference, power of the FUE unit of the aggressor cell may be controlled according to a situation of channel interference.

Accordingly, in 106, the MUE unit of the victim cell calculates a threshold interference value for each of the at least one neighboring UE unit. Herein, the threshold interference value may be derived by using a target signal-to-noise ratio of each UE unit, and the target signal-to-interference-plus-noise ratio satisfies Equation 3 below.

$$SINR_{victim}^{tar} = \frac{P_{victim}G_{victim}}{I_{victim}^{tot} + N} \quad \text{[Equation 3]}$$

In addition, the derived threshold interference value is transferred to the FeNB.

In 107 to 109, the FeNB may determine whether or not the FUE unit is in association with an aggressor cell among neighboring UE units on the basis of the received threshold interference value and prestored RSRP information on the FUE unit among the neighboring UE units, and stores all resulting FUE units of the aggressor cell in an aggressor cell list. Herein, the UE units are units present in the neighboring cell, and the FUE unit is a unit that is present in a cell included in the CSG list of the FeNB among the neighboring UE units.

In other words, when the received threshold interference value of the FeNB is determined to be smaller than prestored downlink RSRP information of the FUE unit in 107, in 108, the FeNB determines the corresponding FUE unit as the FUE unit of the aggressor cell. Subsequently, in 109, the FUE unit of the aggressor cell is added to the aggressor cell list, and the aggressor cell list transferred to the eNB. The above series of processes are repeated for all neighboring UE units, and the aggressor cell list is generated as shown in Table 1 below.

TABLE 1

| Reported value | Measured quantity value | Unit |
| --- | --- | --- |
| RSRP_00 | RSRP < −140 | dBm |
| RSRP_01 | −140 ≤ RSRP < −139 | dBm |
| RSRP_02 | −139 ≤ RSRP < −138 | dBm |
| ... | ... | ... |
| RSRP_95 | −46 ≤ RSRP < −45 | dBm |
| RSRP_96 | −45 ≤ RSRP < −44 | dBm |
| RSRP_97 | −44 ≤ RSRP | dBm |

Referring to Table 1, when downlink RSRP is higher than a threshold interference value of 140 dBm, the corresponding UE unit is determined as the FUE unit of the aggressor cell, and added to the aggressor cell list. Herein, all UE units with downlink RSRP being higher than the threshold interference value of 140 dBm may be determined as the FUE unit of the aggressor cell in uplink transmission.

Herein, the threshold interference value is used both in idle and connected states within a range from −140dBm to −44 dBm, and RSRP for usable signals ranges from about −75 dBm close in an LTE cell site, and about −120 dBm in an LTE coverage.

Subsequently, in 110, the eNB derives the worst FUE unit of the aggressor cell by performing sorting for aggressor cell lists. Subsequently, in 111, the eNB transfers information on downlink RSRP of the derived worst FUE unit of the aggressor cell to the FeNB in which the worst FUE unit of the aggressor cell is registered. Subsequently, in 112, the FeNB that has received the information on the downlink RSRP gradually decreases power $P_{PUSCH,i}^{FIMUE}$ of the worst FUE unit of the aggressor cell. In addition, the decreased power $P_{PUSCH,i}^{FIMUE}$ satisfies Equation 4 below.

$$P_{PUSCH,i}^{FIMUE} = P_{PUSCH,i-1}^{FIMUE} - \Delta P \quad \text{[Equation 4]}$$

where ΔP=0.5 dBm

Subsequently, in 111, the power of the FUE unit of the aggressor cell is repeatedly decreased until an interference value of $I_{victim}^{rec}$ the MUE unit of the victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$.

Accordingly, a relation between powers of the MUE unit of the victim cell and the FUE unit of the aggressor cell satisfies Equation 5 below.

$$P_{PUSCH,i}^{FIMUE} = P_{PUSCH,i-1}^{FIMUE} \quad \text{[Equation 5]}$$

According to an embodiment, among UE units neighboring to the MUE unit of the victim cell, the FUE unit of the aggressor cell may be derived on the basis of information on RSRP of FUE unit registered in the closed subscriber group, and a threshold interference value of the UE unit. Subsequently, power of the derived FUE unit of the aggressor cell may be gradually decreased until an interference value $I_{victim}^{rec}$ of the MUE unit of the victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$. Accordingly, co-channel interference can be reduced in a heterogeneous network environment, data transmission speed can be significantly improved, and latency time can be reduced by reducing conventional feedback time.

Figure 3:
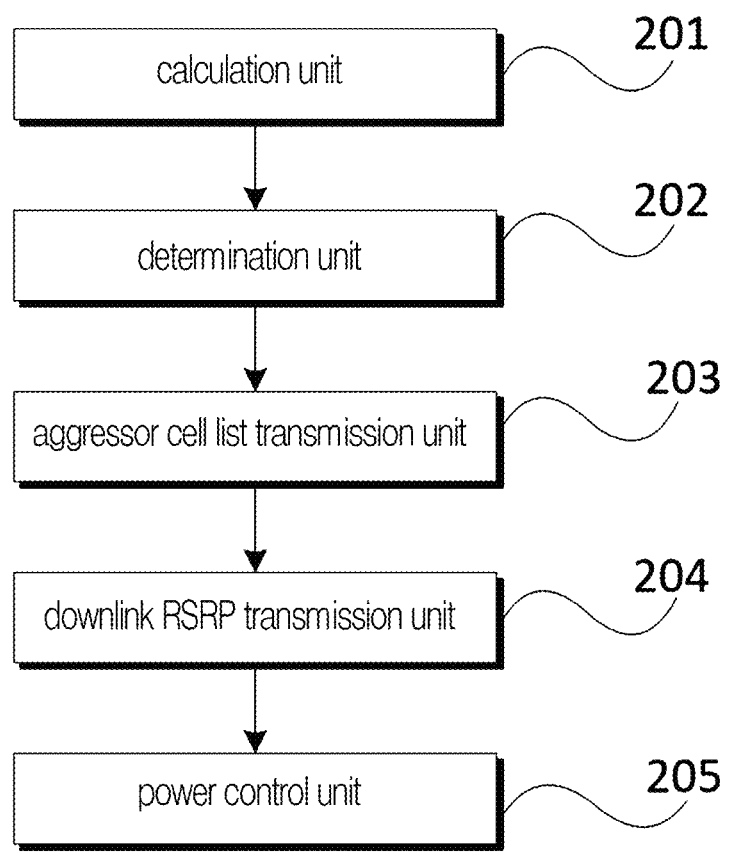
FIG. 3 is a view of a detailed configuration of a power control apparatus in an exemplary system.

FIG. 3 is a view showing a power control apparatus for reducing co-channel interference in the wireless communication system shown in FIG. 1. Referring to FIG. 3, for the wireless communication system including the MUE units, the FUE units, the FeNBs, and the eNB, the power control apparatus may include a calculation unit 201, a determination unit 202, an aggressor cell list transmission unit 203, a downlink RSRP transmission unit 204, and a power control unit 205.

The calculation unit 201 calculates a threshold interference value in the MUE unit that receives co-channel interference from the FUE unit by using a target SINR, and transfers the calculated threshold interference value to the FeNB.

The determination unit 202 determines whether or not the registered FUE unit corresponds to an FUE unit of an aggressor cell on the basis of the received threshold interference value and information on RSRP of the FUE unit provided from downlink transmission of the eNB. When it is determined that the FUE unit corresponds to the FUE unit of the aggressor cell, the aggressor cell list transmission unit 203 stores the FUE unit of the aggressor cell in an aggressor cell list of the FeNB, and transfers the aggressor cell list of the FeNB to the eNB.

In addition, the downlink RSRP transmission unit 204 performs sorting for the received aggressor cell lists of multiple FeNBs so as to determine the worst FUE unit of the aggressor cell, and then transfers information on downlink RSRP of the worst FUE unit of the aggressor cell to the FeNB in which the worst FUE unit of the aggressor cell is registered.

Also, the power control unit 205 gradually decreases power of the worst FUE unit of the aggressor cell in the FeNB in which the worst FUE unit of the aggressor cell is registered. Herein, the power of the FUE unit of the aggressor cell is repeatedly decreased until an interference value $I_{victim}^{rec}$ of the MUE unit of the victim cell becomes greater than a predefined threshold interference value $I_{victim}^{th}$, and a signal-to-interference-plus-noise ratio $SINR^{aggressor}$ of the FUE unit of the aggressor cell becomes equal to greater than a target signal-to-interference-plus-noise ratio $SINR_{target}^{aggressor}$.

According to an embodiment, among UE units neighboring to the MUE unit of the victim cell, the UE unit of the aggressor cell may be derived on the basis of RSRP of the FUE unit registered in the closed subscriber group, and a threshold interference value of the FUE unit. Subsequently, power of the derived FUE unit of the aggressor cell may be gradually decreased until the interference value of the MUE unit of the victim cell becomes greater than the predefined threshold interference value and the SINR of the FUE unit of the aggressor cell becomes equal to or greater than the target SINR. Accordingly, co-channel interference can be reduced in a heterogeneous network environment, data transmission speed can be significantly improved, and latency time can be reduced by reducing conventional feedback time.

Herein, it is not limited to the embodiments described, and may be embodied in other forms. Rather, the exemplary embodiments are provided so that the above disclosure will be thorough and complete, and will fully convey the scope of the application to those of ordinary skill in the art.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling a heterogeneous network configured with an evolved base station (eNB) at a center of a deployed area and multiple femto base stations (FeNBs) in the deployed area, wherein the eNB includes multiple macro user equipment (MUE) units and more than one femto user equipment (FUE) unit is registered in each FeNB, the method comprising:
    registering information on reference signal receive power (RSRP) of a registered FUE unit in the FeNBs and the eNB;
    requesting a connection between an FUE unit and an MUE unit to a neighbor FeNB;
    if an RSRP received from the FeNB is greater than a predefined threshold and the FUE unit is in a closed-subscriber group (CSG) list, providing communication services with the FeNB;
    if the MUE unit is not in the CSG list, receiving co-channel interference from neighboring FUEs; and
    controlling power of the FUE unit in association with an aggressor cell by using RSRP information received from the eNB when co-channel interference occurs.

2. The method of claim 1, wherein the RSRP is used to create a victim list on each macro or femto base station.

3. The method of claim 1, wherein the controlling power of the FUE unit includes:
    calculating, by the MUE unit where the co-channel interference has occurred, a threshold interference value of a neighboring FUE unit by using a target signal-to-interference-plus-noise ratio (SINR);
    determining, by the FeNB, whether or not the registered FUE unit is in association with the aggressor cell on the basis of the received threshold interference value and the RSRP information registered in the FeNB;
    registering, by the FeNB, the FUE unit of the aggressor cell in an aggressor cell list when it is determined that the registered FUE unit is in association with the aggressor cell, and transferring the aggressor cell list to the eNB;
    performing, by the eNB, sorting for aggressor cell lists of multiple FeNBs so as to determine a worst FUE unit of the aggressor cell, and transferring information on downlink RSRP of the worst FUE unit of the aggressor cell to the FeNB in which the worst FUE unit of the aggressor cell is registered; and
    gradually decreasing, by the FeNB in which the worst FUE unit of the aggressor cell is registered, power of the worst FUE unit of the aggressor cell.

4. The method of claim 3, wherein the power of the worst FUE unit of the aggressor cell is repeatedly decreased until an interference value $I_{victim}^{rec}$ of the MUE unit that is in association with a victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR^{aggressor}$.

5. The method of claim 4, wherein the controlling, by the FeNB, power of the FUE unit is repeated until a relation between powers of the MUE unit of the victim cell and the FUE unit of the aggressor cell satisfies Equation 1 below, $$P_{PUSCH,i}^{FIMUE} = P_{PUSCH,i-1}^{FIMUE} \quad \text{[Equation 1]}.$$

6. A wireless communication system, wherein the system is configured with multiple femto base stations (FeNBs) in which one femto user equipment (FUE) unit is registered in each FeNB, and an evolved base station (eNB) including multiple macro user equipment (MUE) units, wherein
    the FeNB, in which one FUE unit is registered, is configured to receive a threshold interference value from the MUE unit, and information on downlink RSRP from the eNB, determine whether or not the FUE unit is in association with an aggressor cell on the basis of the received threshold interference value and pre-registered RSRP information of the FUE unit, and when it is determined that the FUE unit is in association with the aggressor cell, add the FUE unit to an aggressor cell list, and transfer the aggressor cell list to the eNB;
    the eNB is configured to perform sorting for the received aggressor cell list so as to determine a worst FUE unit of the aggressor cell, and transfer information on downlink RSRP of the worst FUE unit of the aggressor cell to the FeNB in which the worst FUE unit of the aggressor cell is registered; and
    the FeNB, in which the worst FUE unit of the aggressor cell is registered, is configured to repeatedly decrease power of the worst FUE unit of the aggressor cell until an interference value $I_{victim}^{rec}$ of the MUE unit that is in association with a victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$.

7. A power control apparatus in a wireless communication system, wherein the system is configured with multiple femto base stations (FeNBs) in which one femto user equipment (FUE) unit is registered in each FeNB, and an evolved base station (eNB) including multiple macro user equipment (MUE) units, the power control apparatus comprising:

a calculation unit, calculating a threshold interference value of an adjacent FUE unit in the MUE unit in association with a victim cell receiving co-channel interference from the FUE by using a target SINR;

a determination unit determining whether or not the registered FUE unit corresponds to an FUE unit of an aggressor cell on the basis of the threshold interference value received from the FeNB, and information on downlink RSRP of the FUE unit received from the eNB;

an aggressor cell list transmission unit storing the registered FUE unit in an aggressor cell list of the FeNB when it is determined that the registered FUE unit corresponds to the FUE unit of the aggressor cell, and transferring the aggressor cell list to the eNB;

a downlink RSRP transmission unit performing sorting for aggressor cell lists of multiple FeNBs received in the eNB so as to determine a worst FUE unit of the aggressor cell, and transferring information on downlink RSRP of the worst FUE unit of the aggressor cell to the FeNB in which the worst FUE unit of the aggressor cell is registered; and a power control unit gradually decreasing power of the worst FUE unit of the aggressor cell, wherein the power of the worst FUE unit of the aggressor cell is repeatedly decreased until an interference value $I_{victim}^{rec}$ of the MUE unit that is in association with the victim cell becomes greater than a predefined threshold interference value $I_{victim}^{th}$, and a signal-to-interference-plus-noise ratio $SINR^{aggressor}$ of the FUE unit of the aggressor cell becomes equal to or greater than a target signal-to-interference-plus-noise ratio $SINR_{target}^{aggressor}$.

* * * * *